United States Patent [19]

Whitesides

[11] 3,766,988

[45] Oct. 23, 1973

[54] ROTARY HOE
[75] Inventor: Jack C. Whitesides, Columbus, Ga.
[73] Assignee: Kelley Manufacturing Company, Tifton, Ga.
[22] Filed: May 15, 1972
[21] Appl. No.: 252,982

[52] U.S. Cl. .............................. 172/548, 172/555
[51] Int. Cl. ............................................. A01b 21/02
[58] Field of Search .................... 172/555, 548, 549, 172/542, 549, 556, 118, 122, 123, 540

[56] References Cited
UNITED STATES PATENTS

| 3,232,356 | 2/1966 | Whitesides | 172/548 |
| 830,939 | 9/1906 | Thompson | 172/122 X |
| 3,397,748 | 8/1968 | Whitesides | 172/548 |

Primary Examiner—Robert E. Pulfrey
Assistant Examiner—Stephen C. Pellegrino
Attorney—Harold D. Jones, Jr. et al.

[57] ABSTRACT

A rotary hoe of the type to be arranged with a gang of similar rotary hoes on a common axis of rotation disposed at an angle other than 90° with respect to the normal direction of movement of the gang of hoes across the ground. A plurality of spaced tines extend generally radially outwardly from a central hub and curve rearwardly with respect to the normal direction of rotation of the rotary hoe and penetrate the ground and move through the ground in a direction generally across the direction of movement of the gang of hoes over the ground. The tines are approximately triangular in cross section and are shaped so that the rotary hoe can be positioned with its plane of rotation disposed at an angle on either side of the direction of movement of the gang of rotary hoes.

4 Claims, 6 Drawing Figures

PATENTED OCT 23 1973 3,766,988

ROTARY HOE

BACKGROUND OF THE INVENTION

Rotary hoes having a central hub and a plurality of spaced tines radiating outwardly from the hub in a single plane are generally well-known in the farm industry. Rotary hoes of this type have been used to till the soil by being arranged in a gang of rotary hoes on a single axle, the axle disposed at an angle other than 90° with respect to the direction of movement of the gang across the ground, and the gang is lowered onto the ground so that the tines of each rotary hoe penetrate the ground and rotate generally laterally across the direction of movement of the gang to plow or till the soil as the gang is moved in a forward direction by a tractor, etc.

The first rotary hoes that were used alone or in gangs of rotary hoes were arranged so that their planes of rotation were substantially coextensive with the direction of movement of the gang of hoes, and the tines of each rotary hoe merely penetrated the soil and the tines had little if any lateral movement and virtually no plowing or tilling of the soil occurred. When it became customary to turn the axle of the gangs of rotary hoes to an angle other than 90° with respect to the direction of movement of the gangs so that the tines of the rotary hoes would move generally laterally across the direction of movement of the gang and therefore plow or till the soil, various different tine constructions were developed so as to enhance the tilling function performed by the tine. For instance, in my previous U.S. Pat. No. 3,232,356, I provided a rotary hoe with tines having an acute angle at one lateral edge and with surfaces which tended to slice through the soil requiring a small amount of force from the towing vehicle. While my previous invention and the other prior art rotary hoes have been successful to some degree, there are various disadvantages which remain unsolved. For instance, in my previous design, left and right handed rotary hoes are required, as when a gang of rotary hoes is to be disposed with their planes of rotation disposed at an angle to the left of the direction of movement of the gang of hoes, the sharp edge of each tine had to be located on the right side of each rotary hoe, while the opposite was true for the rotary hoes oriented to the other side of the direction of movement of the gang of hoes. In other designs the penetration of the soil by the rotary hoe tines and tine breakage were problems, and in my previous design and in other designs the tines tend to compact the soil due to the tine shape.

SUMMARY OF THE INVENTION

Briefly described, the present invention comprises a rotary hoe of the type used in a series or gang of rotary hoes on a common axis of rotation disposed an an angle other than 90° with respect to the normal direction of movement of the gang of hoes across the ground. The tine construction of the rotary hoe is such as to render the rotary hoe both "left-handed" and "right-handed" and the plane of rotation of the rotary hoe can be disposed at an angle to the left of or to the right of the direction of movement of the gang of hoes across the ground. Each tine is approximately triangular in cross section along a major portion of its length from the tip back to the hub of the rotary hoe, and each tine is curved rearwardly from its hub to its tip in a direction opposite from the normal direction of rotation of the rotary hoe, with the leading portion of each tine comprising a curved edge with side surfaces diverging rearwardly at equal angles on opposite sides of the plane of rotation through the leading edge. The back surface of each tine is substantially parallel to the axis of rotation of the rotary hoe. When each tine penetrates the soil, the leading curved edge of the tine first engages and penetrates the soil, and the leading side edge of the tine subsequently slices through the soil with the soil passing about the leading side edge over the back surface and over the adjacent side surface as the tine moves laterally across the direction of movement of the gang of rotary hoes. The curvature of each tine is formed so that relatively small amounts of frictional contact is experienced between the soil and the surfaces of the tines yet the tines function to penetrate and till the soil, sweep through the soil, urge the soil laterally and uproot weeds and grass, etc.

Thus, it is an object of the present invention to provide a rotary hoe which is suitable for tilling soil, which is both "right-handed" and "left-handed", and which is inexpensive to produce and which is durable.

Other objects, features and advantages of the present invention will become apparent upon reading the following specification, when taken in conjunction with the accompanying drawing.

DESCRIPTION OF THE PREFERRED EMBODIMENT

Figure 1:
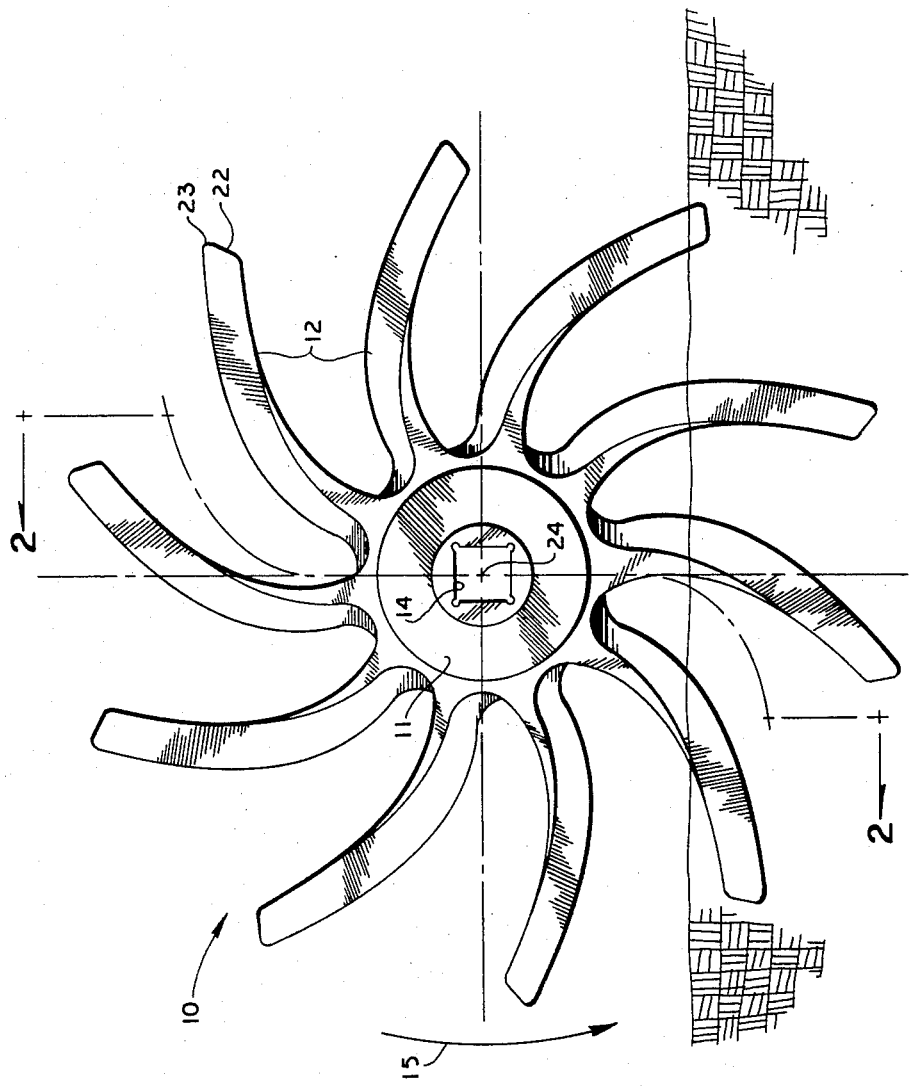
FIG. 1 is a side view of the rotary hoe.

Referring now in more detail to the drawing, in which like numerals indicate like parts throughout the several views, FIG. 1 illustrates a rotary hoe 10 which includes a hub 11 and a plurality of tines 12 which radiate from hub 11 in a common plane at equally spaced intervals. Hub 11 comprises a square central opening 14 for the insertion therethrough of an axle for the purpose of mounting rotary hoe 10 on the axle with other duplicate rotary hoes to form a series or gang of rotary hoes.

Figure 2:
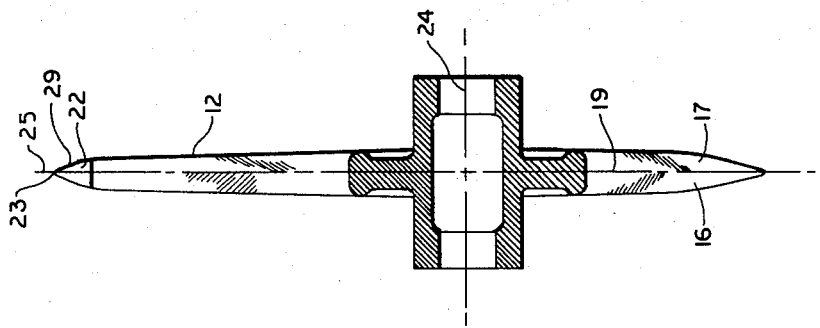
FIG. 2 is an end cross-sectional view of the rotary hoe taken along lines 2—2 of FIG. 1.
Figure 3:
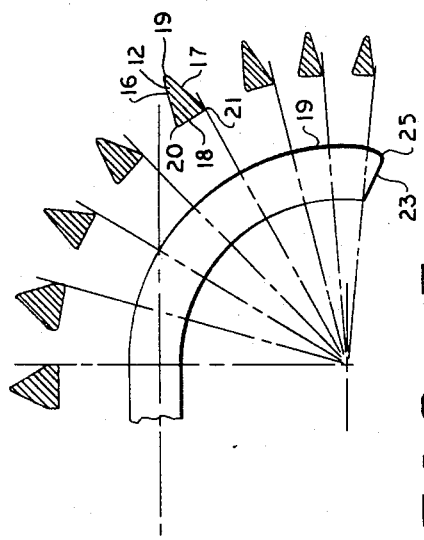
FIG. 3 is a layout of one of the tines, showing the cross-sectional configuration of a tine at various intervals along the length of the tine.

Each tine 12 is arcuate in shape and curves in the direction opposite to the normal direction of rotation of the rotary hoe as indicated by arrow 15. As is illustrated in FIG. 3, each tine 12 comprises side surfaces 16 and 17, and back surface 18. Side surfaces 16 and 17 converge together to form arcuate leading edge 19 while back surface 18 merges with side surfaces 16 and 17 to form side edges 20 and 21. Back surface 18 is substantially parallel to the axis of rotation 24 of the rotary hoe, and side surfaces 16 and 17 diverge outwardly from leading edge 19 at equal angles on opposite sides of the plane of rotation 25 (FIG. 2) projected through the leading edge 19 of the tine. The axis of rotation 24 is normal to the plane of rotation 25.

Side surfaces 16 and 17 are approximately equal to each other in width along the length of the tine, and side surfaces 16 and 17 are approximately of uniform width along the length of the tine. Back surface 18 of tine 12 becomes progressively narrower from the hub 11 toward the distal end 22 of the tine. For instance, while the tines can be made in various size ranges to accomplish substantially the same tilling functions, the tine disclosed herein has a back surface 18 which is approximately three-fourths of an inch adjacent hub 11 and is progressively tapered to a dimension of approximately three-eighths of an inch in width adjacent the distal end 22 of the tine. By contrast, the side surfaces 16 and 17 of the tines are substantially uniform in width along their lengths since they are approximately seven-eighths of an inch wide adjacent hub 11 and are reduced slightly in width near their distal end to a width of three-fourths of an inch. The radius of curvature of the leading edge 19 of each tine is approximately 3 and ¾ inch, while the radius of curvature of the back surface 18 of each tine is approximately 2 and ⅞ inch.

The distal end 22 of each tine is approximately flat, and the plane of the flat distal end of each tine extends at an approximate tangent with respect to the hub 11 of the rotary hoe, leaving a tip or point 23 at the intersection of the leading edge 19 with the flat distal end 22.

Figure 4:
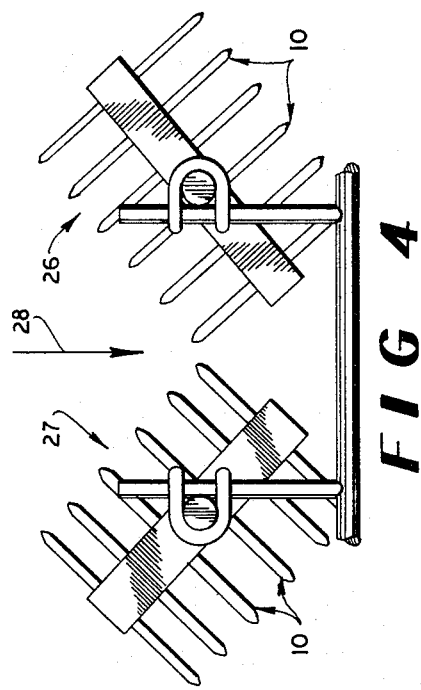
FIG. 4 is a plan view of a pair of gangs of rotary hoes as they would be mounted to till the ground.

As is illustrated in FIG. 4, a plurality of rotary hoes 10 are placed on a common axle to form a gang 26 or 27 of rotary hoes. The gangs 26 and 27 normally will be oriented so that their axes of rotation are at an angle other than 90° with respect to the direction of movement of the gangs across the ground as indicated by arrow 28.

Figure 5:
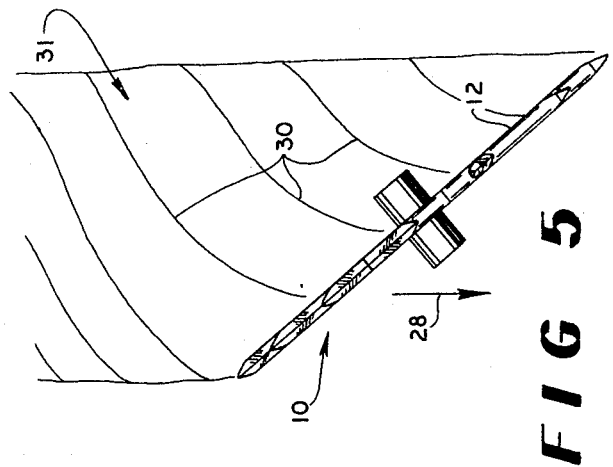
FIG. 5 is a schematic illustration of one rotary hoe, showing the paths of movement of the outer ends of the tines which have penetrated the ground.

As is illustrated in FIG. 5, as each rotary hoe rotates, each of its tines 12 will move in a spiral movement, and when a tine engages and penetrates the ground, the tine will move laterally through the ground across the direction of movement 28 of the rotary hoe in performing its ground tilling function as illustrated by the dashed lines 30 of FIG. 5 which represents the paths of movement of the distal ends of the tines which penetrated the soil.

Figure 6:
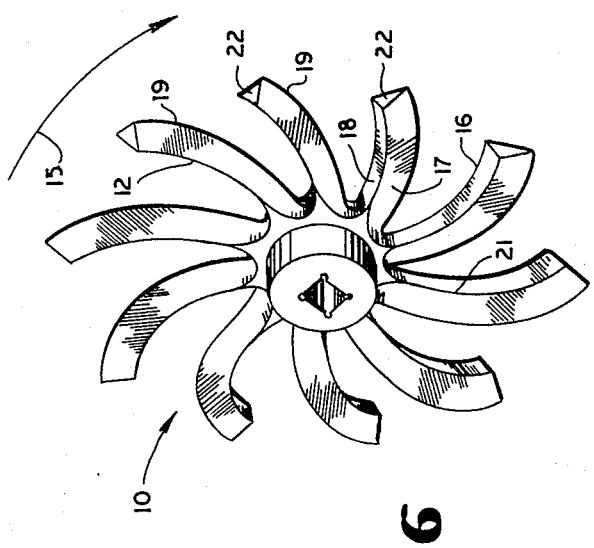
FIG. 6 is a schematic illustration of the rotary hoe as it would be viewed at ground level, the tines of the rotary hoe penetrating the ground and with the rotary hoe disposed at an angle and moving out of the picture.

As is illustrated in FIG. 6, the leading arcuate edge 19 of each tine 12 first engages and penetrates the soil as the rotary hoe rotates in the direction indicated by arrow 15. The acute angle of the leading edge is sharp enough so that the leading edge can penetrate the soil without undue resistance, and the linear movement of the rotary hoe across the ground as indicated by arrow 28 in FIG. 5 causes the leading edge 19 to slice along and into the soil. As the distal end 22 of each tine becomes submerged in the soil, the angle of the approximately flat distal end 22 and its point 23 tend to wedge the end of the tine deeper into the soil as the rotary hoe moves across the ground in the direction indicated by the arrow 28 in FIG. 5. In addition, the back surface 18 of the tine begins to assist the penetration of the tine into the soil as the tine continues to become submerged in the soil since the back surface is curved generally upwardly from the distal end 22 toward hub 11. The side edge 21 thus tends to slice through the soil with the soil passing about side surface 17 and back surface 18 on opposite sides of the tine and generally along the length of the tine. The portion of the soil engaging the edge 29 formed between the distal end 22 and the side surface 17 tends to move about the edge 29, with a portion of the soil moving across distal end 22 and the remaining soil moving along the length of side surface 17.

As each tine 12 progresses in its rotation through the soil, its back surface 18 becomes more and more exposed to the forces encountered between the tines and the soil due to curvature of the tines and the orientation of the back surface 18. The back surfaces 18 thus function to pull the tine deeper into the soil and thus assist in the rotation of the rotary hoe as it passes over the ground.

As is best illustrated in FIGS. 4, 5, and 6, each tine 12 moves generally laterally across the direction of movement of its rotary hoe as the rotary hoe is pulled across the ground, and the tines therefore function to penetrate and till a ribbon of soil 31. When a plurality of rotary hoes are placed in a gang of hoes as illustrated in FIG. 4, the close spacing of each rotary hoe causes the ribbons of soil tilled by each rotary hoe to overlap and a thorough tilling of the soil is achieved.

If it is desired to reverse one or more of the gangs of rotary hoes, so that one gang can be oriented in one attitude while the other gang is oriented in the opposite attitude as illustrated in FIG. 4, it is not necessary to remove the rotary hoes and replace them with other rotary hoes since the side surfaces of the tines are mirror images of each other, thus causing the tines to be both "left-handed" and "right-handed" in that their planes of rotation can be oriented at an angle either to the right or to the left of the direction of movement of the gang of rotary hoes over the ground.

While this invention has been described in detail with particular reference to a preferred embodiment thereof, it will be understood that variations and modifications can be effected within the spirit and scope of the invention as described hereinbefore and as defined in the appended claims.

I claim:

1. A rotary hoe of the type to be arranged with a gang of similar rotary hoes on a common axis of rotation disposed at an angle other than 90° with respect to the normal direction of movement of the gang of hoes over the ground, said rotary hoe comprising a central hub, a plurality of spaced arcuate tines extending generally radially outwardly from said central hub and curved rearwardly with respect to their normal direction of rotation about said common axis and arranged to penetrate the ground and move through the ground in a direction generally across the direction of movement of the gang of hoes over the ground, each of said tines being approximately triangular in cross section with side surfaces of each of said tines being approximately of uniform width along their lengths and of approximately the same widths as each other and converging together with each other at an acute angle to form a leading edge, and with a back surface of decreasing width from the hub toward the end of the tine, said back surface being approximately parallel to the axis of rotation of said rotary hoe and converging together with said side surfaces to form side edges.

2. The rotary hoe of claim 1 and wherein the end of each tine is generally flat and disposed in a plane approximately tangent with said hub.

3. A rotary hoe of the type to be arranged with a plurality of similar rotary hoes on a common axis of rotation disposed at an angle other than 90° with respect to the normal direction of movement of the rotary hoes along the ground, said rotary hoe comprising a central hub, a plurality of ground penetrating tines radiating outwardly from said hub in a common plane with each tine curved along it length rearwardly away from its normal direction of rotation, each of said tines being approximately triangular in cross section along a major portion of its length with side surfaces of approximately uniform width from the hub to the end of the tine and with the side surfaces being approximately the same width and converging together with each other to form a leading edge, and with a back surface of decreasing width from the hub toward the end of the tine and converging at each of its sides with said side surfaces to form side edges, each of said side surfaces being progressively twisted along its length from the hub to the end of the tine and forming equal angles on opposite sides of the plane of rotation of said rotary hoe along the length of the tine progressively from the hub to the end of the tine, whereby said rotary hoe can be positioned with its plane of rotation at an angle of either side of the direction of movement of the plurality of rotary hoes and said leading edge initially penetrates the ground and one of said side edges subsequently wedges through the ground with the soil of the ground flowing generally on opposite sides of said one of said side edges about the back surface and the side surface adjacent said one of said side edges.

4. A rotary hoe of the type to be arranged with a gang of similar rotary hoes on a common axis of rotation disposed at an angle of 90° with respect to the normal direction of movement of the gang of hoes over the ground, said rotary hoe comprising a central hub, a plurality of spaced arcuate tines extending generally radially outwardly from said central hub and curved rearwardly with respect to their normal direction of rotation about said common axis and arranged to penetrate the ground and move through the ground in a direction generally across the direction of movement of the gang of hoes over the ground, each of said tines being approximately triangular in cross section with side surfaces converging together with each other at equal acute angles to a plane normal to the common axis of rotation to form a leading edge, and with a back surface being approximately parallel to the axis of rotation of said rotary hoe and converging together with said side surfaces to form side edges.

* * * * *